United States Patent [19]
DeGrace

[11] Patent Number: 6,031,303
[45] Date of Patent: Feb. 29, 2000

[54] METHOD OF JOINING A MEMBER OF SOFT MAGNETIC MATERIAL TO A MEMBER OF HARDENED MATERIAL USING A BRAZING TECHNIQUE

[75] Inventor: Louis G. DeGrace, Newport News, Va.

[73] Assignee: Siemens Automotive Corporation, Newport News, Va.

[21] Appl. No.: 09/181,423

[22] Filed: Oct. 28, 1998

Related U.S. Application Data

[60] Provisional application No. 60/067,984, Dec. 9, 1997.

[51] Int. Cl.⁷ .................................................. H02K 15/02
[52] U.S. Cl. ............................... 310/42; 310/264; 29/598
[58] Field of Search ............................ 310/42, 261, 264; 29/596, 598; 335/249, 261, 270, 279

[56] References Cited

U.S. PATENT DOCUMENTS

| | | | |
|---|---|---|---|
| 1,898,487 | 2/1933 | Hurley | 148/649 |
| 2,333,622 | 11/1943 | McNab | 313/632 |
| 2,500,748 | 3/1950 | Grant | 335/281 |
| 2,739,375 | 3/1956 | Coxe | 228/121 |
| 3,238,606 | 3/1966 | Tolson | 29/890.043 |
| 3,496,629 | 2/1970 | Martucci et al. | 228/168 |
| 3,743,898 | 7/1973 | Sturman | 335/254 X |
| 4,029,476 | 6/1977 | Knopp | 428/676 |
| 4,133,473 | 1/1979 | Tabelev et al. | 228/215 |
| 5,193,266 | 3/1993 | Caputo | 29/598 |
| 5,400,951 | 3/1995 | Shiroyama et al. | 228/168 |
| 5,636,601 | 6/1997 | Moriya et al. | 123/90.11 |
| 5,894,010 | 4/1999 | Porkert et al. | 420/15 |

FOREIGN PATENT DOCUMENTS

| | | |
|---|---|---|
| 33 29 009 | 6/1984 | Germany . |
| 35 02 287 | 7/1986 | Germany . |
| 35 23 452 | 1/1987 | Germany . |
| WO 94 02 983 | 2/1994 | WIPO . |

*Primary Examiner*—Nestor Ramirez
*Assistant Examiner*—Judson H. Jones

[57] ABSTRACT

A method of joining a magnetic armature of an electromagnetic actuator to a shaft is provided. The armature has an aperture therein. The method includes inserting a portion of the shaft into the aperture thereby defining a space between the shaft and the armature. Brazing material is placed adjacent to the aperture. The brazing material is caused to melt and wick into the space. The brazing material is permitted to cool to define a joint between the shaft and the armature.

24 Claims, 1 Drawing Sheet

METHOD OF JOINING A MEMBER OF SOFT MAGNETIC MATERIAL TO A MEMBER OF HARDENED MATERIAL USING A BRAZING TECHNIQUE

This Patent Application claims priority to U.S. Provisional Patent Application No. 60/067,984, filed Dec. 9, 1997, the contents of which is hereby incorporated by reference in its entirety herein.

FIELD OF THE INVENTION

This invention relates to joining a member of soft magnetic material to a member of hardened material and, more particularly, to joining an annealed magnetic armature of an electromagnetic actuator with a hardened shaft using a brazing technique.

BACKGROUND OF THE INVENTION

In an electromagnetic device, such as an electromagnetic actuator of an electronic valve timing system for a motor vehicle, it is often necessary to join a "soft" magnetic material and a hardened, non-magnetic or magnetic material. Typically, the soft magnetic material is in the form of an armature and is annealed to remove most internal stresses and any carbon which may be within the material. The annealing process accounts for consistent magnetic and mechanical performance characteristics of the magnetic circuit components. In an actuator, the hardened material is in the form of a shaft.

One approach to joining the shaft to the armature is to physically deform the armature to engage a feature in the shaft. However, this approach may involve significant tooling costs in order to perform the deforming operation. Further, a deforming operation is not a batch type process and thus, it may take a significant amount of time to join a plurality of shafts and armatures, since generally only one shaft-armature connection can be done at a time.

Accordingly, there is a need to join a soft magnetic material to a hardened material with low tooling costs and in a batch-type process.

SUMMARY OF THE INVENTION

An object of the present invention is to fulfill the need referred to above. In accordance with the principles of the present invention, this objective is obtained by providing a method of joining a magnetic armature of an electromagnetic actuator to a shaft. The armature has an aperture therein. The method includes inserting a portion of the hardened shaft into the aperture thereby defining a space between the shaft and the armature. Brazing material is placed adjacent to the aperture. The brazing material is caused to melt and wick into the space. The brazing material is permitted to cool to define a joint between the shaft and the armature.

In accordance with another aspect of the invention, an armature assembly for an electromagnetic actuator is provided. The armature assembly includes an armature composed of a magnetic material. The armature has an aperture therein. A shaft has a portion disposed in the aperture. A brazing material is disposed between the portion of the shaft and the armature joining the shaft to the armature.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
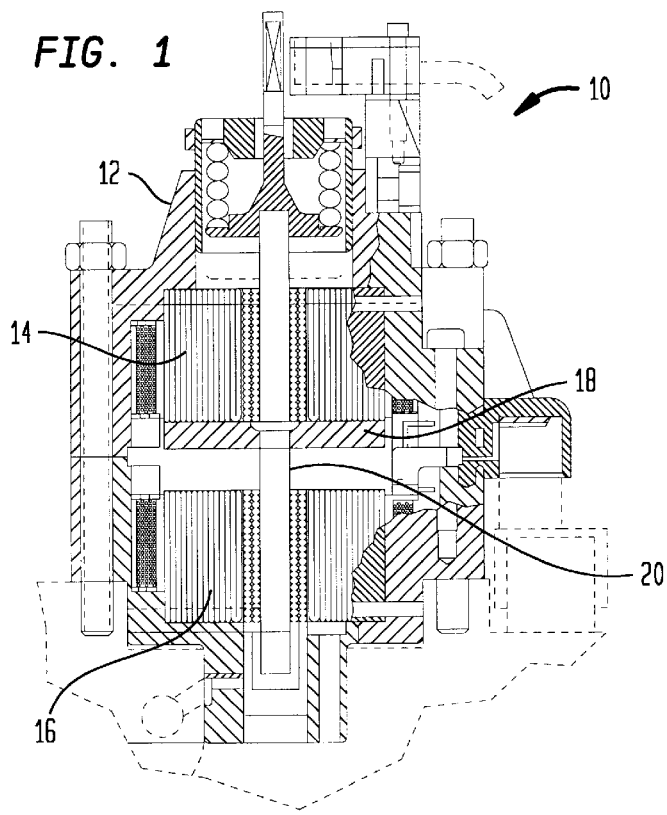
FIG. 1 is a sectional view of an electromagnetic actuator having an annealed armature and a hardened shaft joined by a method provided in accordance with the principles of the present invention.

Referring to FIG. 1, an electromagnetic actuator is shown, generally indicated 10, having an armature-shaft connection provided in accordance with the principles of the present invention. The electromagnetic actuator 10 includes a housing structure 12 containing a first electromagnet 14 and a second electromagnet 16, which is disposed generally in opposing relation to the first electromagnet 16. An armature 18 is arranged for movement between the electromagnets 14 and 16. The armature is carried by a shaft 20. The shaft 20 is coupled to a stem of a gas exchange valve (not shown) in the conventional manner.

Figure 2:
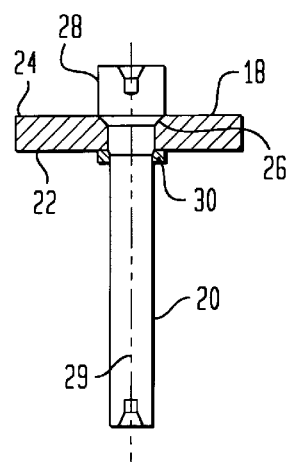
FIG. 2 is an enlarged view partially in section of an armature assembly wherein a shaft is arranged with an armature prior to a brazing operation of the invention.
Figure 3:
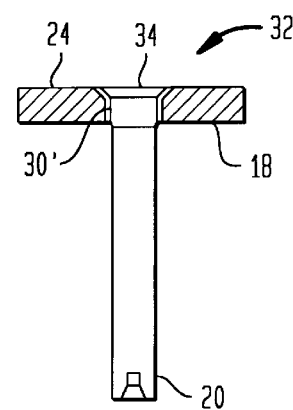
FIG. 3 is an enlarged view of the armature assembly of FIG. 2, shown after performing the method of the invention.

In accordance with the principles of the present invention and with reference to FIGS. 2 and 3, the armature 18 is in the form of a plate having opposing first and second generally planar surfaces 22, and 24, respectively. An aperture 26 is provided in the armature 18 along the axis 29 of the armature 18. The aperture 26 is sized to receive a portion of the shaft 20. The armature 18 is composed of a soft magnetic material such as, for example, silicon iron, cobalt iron and nickel iron. Other soft magnetic material may also be employed. The armature 18 has been annealed to provide optimum magnetic properties.

Figure 4:
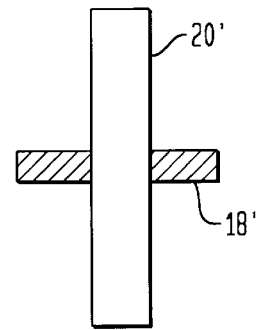
FIG. 4 is an enlarged view of the armature assembly of a second embodiment of the invention.

The shaft 20 is composed of hardened material, preferably an air hardened steel having a hardness generally greater than 52 HRC. Examples of materials which may be used for the shaft 20 are: stainless Type 440C steel, Type H13 steel, and Type A2 steel. Other materials, such as 300 series stainless steel or the like may also be employed for the shaft 20. The shaft 20 is generally cylindrical and in the illustrated embodiment has a head 28 at an end thereof sized to be placed into the aperture 26 of the armature 18. In the illustrated embodiment, the head 28 is tapered as is the aperture to prevent the shaft 20 from falling-out of the armature 18 in one direction. FIG. 4 shows another embodiment of a shaft 20' and armature 18'. As shown, the straight shaft 20' may extend through the armature 18 and may be joined by the brazing method as described below.

To join two components comprising dissimilar metals such as the shaft 20 and armature 18 is, in general, a difficult process because techniques and materials suitable for one metal are frequently unsuitable for the other. The inventors have found that a brazing process may be used to form a reliable joint between the shaft and armature.

The method of joining the shaft 20 to the armature 18 will be appreciated with reference to FIGS. 2 and 3. First, the end of the shaft 20 having the head 28 is inserted into the aperture 26 of the armature 18 thereby defining a small space between the armature 18 and the shaft 20. The brazing compound, which in the illustrated embodiment is a copper ring 30, is placed around the shaft 20 and against surface 22 of the armature 18 so as to be adjacent the aperture 26. It is preferred that the brazing material be copper or a copper alloy. The assembly is then placed in a furnace moved slowly therethrough. The furnace is set at a temperature slightly above the melting point of the brazing material. In the embodiment, since copper is used as the brazing material, the furnace temperature is set to approximately 2000 degrees F. The armature 18, shaft 20, and copper ring are thus heated to 2000 degrees F. and the copper ring 30 melts and wicks into the space between the shaft 20 and the armature 18. The parts are then cooled defining a joint 30' (FIG. 3) between the armature 18 and shaft 20 and thus defining an armature assembly, generally indicated at 32 in FIG. 3. To speed cooling in order to substantially maintain the hardness of the shaft 20, the parts may be cooled by forced convection.

After the shaft 20 has been exposed to the high temperature and then cooled, the shaft 20 is hardened and thus has a hardness substantially greater than the hardness of the armature 18. In the illustrated embodiment, machining operations are then performed to meet tolerances required by the electromagnetic actuator 10. As shown, the head 28 of the shaft 20 is removed and surfaces 22 and 24 of the armature are ground to maintain parallelism. Thus, the end 34 of the shaft 20 is generally flush with planar surface 24. If necessary, the shaft may be machined as well. Further, the process of the invention may be done in batches to increase production.

It has thus been seen that the objects of this invention have been fully and effectively accomplished. It will be realized, however, that the foregoing preferred embodiments have been shown and described for the purposes of illustrating the structural and functional principles of the present invention, as well as illustrating the methods of employing the preferred embodiments, and are subject to change without departing from such principles. Therefore, this invention includes all modifications encompassed within the spirit of the following claims.

What is claimed is:

1. A method of joining a member of annealed magnetic material to a hardened member, the member of magnetic material having an aperture therein, the method comprising:

inserting a portion of the hardened member into said aperture thereby defining a space between said hardened member and the member of magnetic material;

placing a brazing material adjacent said aperture;

causing said brazing material to melt and wick into said space; and cooling said brazing material to define a joint between said hardened member and said member of magnetic material.

2. The method according to claim 1, wherein said hardened member is a shaft and said member of magnetic material is in the form of a plate having first and second generally planar surfaces disposed in opposing relation, said brazing material being in the form of a ring, and wherein placing the brazing material includes placing said ring over said shaft so as to contact one of said planar surfaces.

3. The method according to claim 1, wherein said magnetic material includes one of silicon iron, cobalt iron and nickel iron.

4. The method according to claim 2, wherein said shaft is made from steel.

5. The method according to claim 1, wherein said brazing material includes copper.

6. The method according to claim 2 further including machining said planar surfaces so as to be substantially parallel.

7. The method according to claim 2, wherein said shaft has a head at one end thereof, the method including removing said head after said brazing step such that an end of said shaft is generally flush with one of said planar surfaces of said armature.

8. The method according to claim 1, where in said hardened member extends through said aperture.

9. The method according to claim 1, wherein said hardened member, said member of magnetic material and said brazing member are placed into a furnace and exposed to a temperature to melt said brazing material; said hardened member, said member of magnetic material and said brazing material are cooled in such a manner to substantially maintain the hardness of said hardened member.

10. A method of joining a magnetic armature of an electromagnetic actuator to a shaft, the armature having an aperture there in, the method comprising:

inserting a portion of the shaft into said aperture thereby defining a space between said shaft and said armature;

placing a brazing material adjacent said aperture;

causing said brazing material to melt and wick into said space; and permitting said brazing material to cool to define a joint between said shaft and said armature.

11. The method according to claim 10, wherein said armature is in the form of a plate having first and second generally planar surfaces disposed in opposing relation, said brazing material being in the form of a ring, and wherein placing the brazing material includes placing said ring over said shaft so as to contact one of said planar surfaces.

12. The method according to claim 10, wherein said magnetic armature includes one of silicon iron, cobalt iron and nickel iron.

13. The method according to claim 10, wherein said shaft is made from steel.

14. The method according to claim 10, wherein said brazing material is copper.

15. The method according to claim 10, wherein said shaft extends through said aperture.

16. The method according to claim 10, wherein shaft has a head at one end thereof, the method including removing said head after said brazing step such that an end of said shaft is generally flush with one of said planar surfaces of said armature.

17. The method according to claim 10, wherein said shaft, said armature and said brazing member are placed into a furnace and exposed to a temperature to melt said brazing material; said shaft, said armature and said brazing material are cooled in such a manner to substantially maintain the hardness of said shaft.

18. An armature assembly for an electromagnetic actuator, the armature assembly comprising:

an armature composed of a magnetic material, the armature having an aperture therein;

a shaft having a portion disposed in said aperture; and a brazing material between said portion of said shaft and said armature joining said shaft to said armature.

19. The armature assembly according to claim 18, wherein said armature is in the form of a plate having first and second generally planar surfaces disposed in opposing relation.

20. The armature assembly according to claim 18, wherein said armature includes one of silicon iron, cobalt iron, and nickel iron.

21. The armature assembly according to claim 18, wherein said shaft made from steel.

22. The armature assembly according to claim 21, wherein said steel is a hardenable steel.

23. The armature assembly according to claim 18, wherein said brazing material includes copper.

24. The armature assembly according to claim 18, wherein said shaft extends through said aperture.

\* \* \* \* \*